United States Patent
Gish et al.

(10) Patent No.: US 7,496,705 B2
(45) Date of Patent: Feb. 24, 2009

(54) METHOD AND COMPUTER READABLE MEDIUM FOR SUSPENDED STATE RESOURCE ADAPTER

(75) Inventors: James William Gish, Sudbury, MA (US); Chinnappa Ganapathy Codanda, Boston, MA (US); Brian Christopher Chesebro, Londonderry, NH (US)

(73) Assignee: BEA Systems, Inc., Redwood Shores, CA (US)

( * ) Notice: Subject to any disclaimer, the term of this patent is extended or adjusted under 35 U.S.C. 154(b) by 354 days.

(21) Appl. No.: 11/281,831

(22) Filed: Nov. 17, 2005

(65) Prior Publication Data

US 2007/0113217 A1    May 17, 2007

(51) Int. Cl.
 *G06F 13/14* (2006.01)
(52) U.S. Cl. ................ 710/240; 710/242; 710/268
(58) Field of Classification Search ......... 710/240–244, 710/266–268, 305–306; 713/320, 323; 717/120
 See application file for complete search history.

(56) References Cited

U.S. PATENT DOCUMENTS

| | | | |
|---|---|---|---|
| 5,465,328 A | 11/1995 | Dievendorff | |
| 6,823,519 B1 | 11/2004 | Baird | |
| 7,080,145 B2* | 7/2006 | Srivastava et al. | 709/226 |
| 2003/0061515 A1 | 3/2003 | Kindberg | |
| 2004/0187127 A1* | 9/2004 | Gondi et al. | 718/100 |
| 2005/0003850 A1* | 1/2005 | Tsuda et al. | 455/550.1 |
| 2005/0015425 A1 | 1/2005 | Kumar | |
| 2005/0187891 A1 | 8/2005 | Johnson | |
| 2006/0224633 A1* | 10/2006 | Fahmy et al. | 707/200 |

* cited by examiner

*Primary Examiner*—Raymond N Phan
(74) *Attorney, Agent, or Firm*—Fliesler Meyer LLP

(57) ABSTRACT

In accordance with embodiments, there are provided mechanisms and methods for suspending work by a resource adapter. These mechanisms and methods for suspending work by a resource adapter can enable embodiments to provide the capability to start and stop work performed by a resource adapter to connector architectures. The ability of embodiments to provide the capability to start and stop work performed by a resource adapter can enable users of Connector Architectures to quiesce an adapter's inbound/outbound or work sections. Such capability can enable an adapter embodiment to complete in-flight transactions but not accept new inbound transactions until a request to resume operation is received. Resource adapters may be quiesced during a versioning or change out process or other maintenance processes for example.

10 Claims, 6 Drawing Sheets

METHOD AND COMPUTER READABLE MEDIUM FOR SUSPENDED STATE RESOURCE ADAPTER

CROSS REFERENCE TO RELATED APPLICATIONS

The following commonly owned, co-pending U.S. Patents and Patent Applications, including the present application, are related to each other. Each of the other patents/applications are incorporated by reference herein in its entirety:

U.S. patent application Ser. No. 11/280,060 entitled PRODUCTION REDEPLOYMENT, by James William Gish, et al., filed on Nov. 17, 2005, U.S. patent application Ser. No. 11/281,968 entitled RESOURCE ADAPTOR CLASSLOADING, by Codanda Ganaphthy Chinnappa, et al., filed on Nov. 17, 2005, U.S. patent application Ser. No. 11/281,831 entitled SUSPENDABLE RESOURCE ADAPTOR INTERFACE, by James William Gish, et al., filed on Nov. 17, 2005, and U.S. patent application Ser. No. 11/416,906 entitled RECOVERY MECHANISM FOR TRANSACTIONS, by Brian Christopher Chesebro, et al., filed on May 3, 2006.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The current invention relates generally to techniques for providing interconnectivity between one or more application servers and one or more enterprise information systems, and more particularly to a mechanism for suspending work by a resource adapter.

BACKGROUND

Since its inception in 1995, the Java™ programming language has become increasingly popular. (Java™ is a trademark of Sun Microsystems, Inc.) Java, which is an interpreted language, enabled the creation of applications that could be run on a wide variety of platforms. This ability to function across a variety of different client platforms, i.e., platform independence, and Java's relatively easy implementation of network applications has resulted in the use of Java, as well as other programming languages that provide platform independence, in endeavors as basic as personal web pages to endeavors as complex as large business-to-business enterprise systems.

However, since applications, as well as the Enterprise Information Systems (EIS) to which the applications connect, may be provided by many different vendors, a mechanism that enables these disparate computational entities to communicate with one another was needed. The Java 2 Platform Enterprise Edition (J2EE) is a specification that addresses such needs.

J2EE Connector Architecture provides a mechanism for integrating J2EE-compliant application servers with enterprise information systems. The J2EE Connector Architecture defines a Common Client Interface (CCI) for EIS access. The CCI defines a client API that enables clients to interact with heterogeneous enterprise information systems. Application servers, i.e., servers onto which applications may be deployed, Enterprise Information Systems need only follow a J2EE Connector Architecture specification in order to interconnect with one another.

Unfortunately, the J2EE specification does not resolve all interconnection issues. For example, the J2EE connector architecture leaves responsibility for design of connectors to each application server vendor. One way in which J2EE connectors could be improved is adding capability to suspend work by a resource adapter.

DETAILED DESCRIPTION

Figure 1:
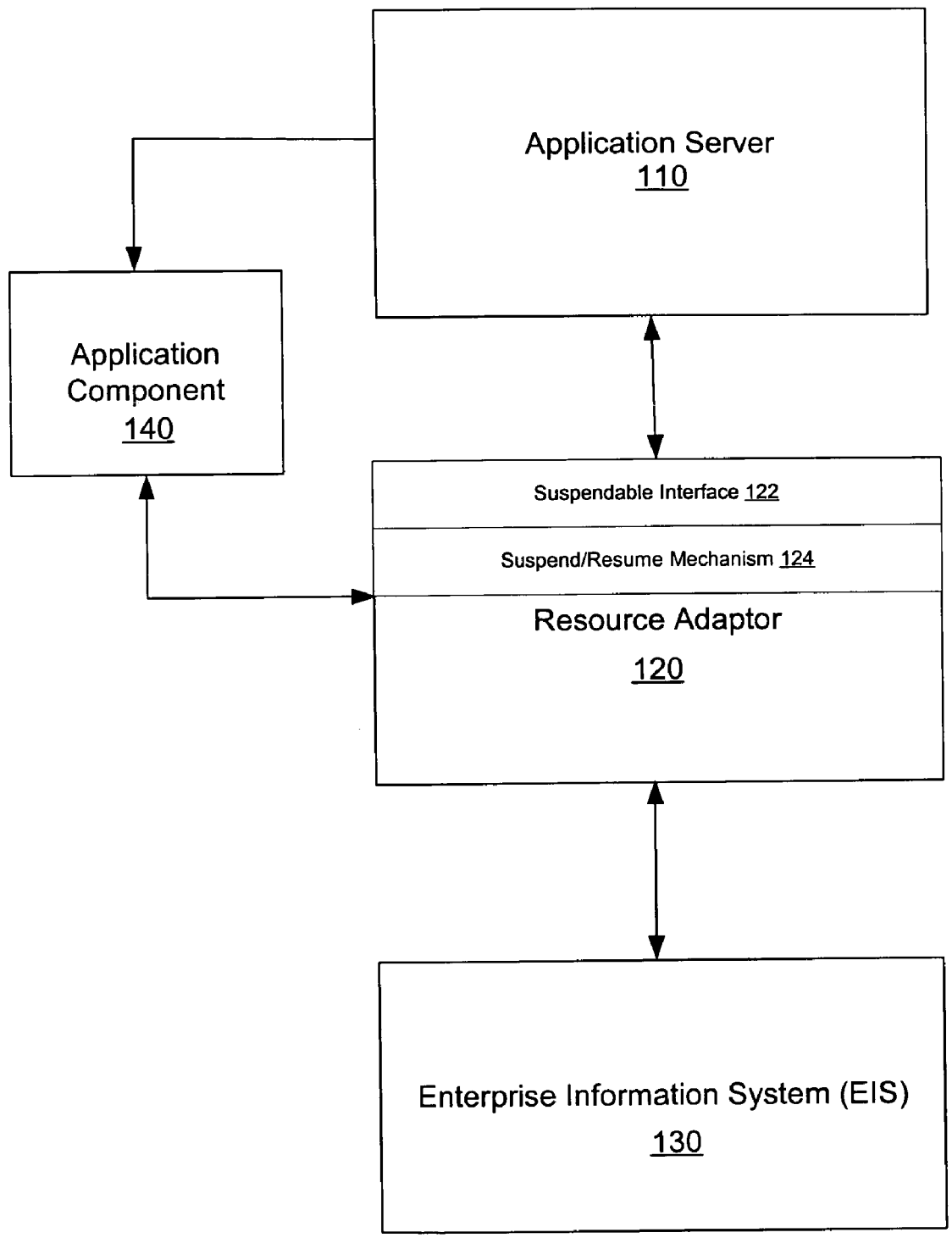
FIG. 1 is functional block diagram illustrating a high level overview of an example computing environment in which techniques for suspending work by a resource adapter in an embodiment may be implemented.

The invention is illustrated by way of example and not by way of limitation in the figures of the accompanying drawings in which like references indicate similar elements. References to embodiments in this disclosure are not necessarily to the same embodiment, and such references mean at least one. While specific implementations are discussed, it is understood that this is done for illustrative purposes only. A person skilled in the relevant art will recognize that other components and configurations may be used without departing from the scope and spirit of the invention.

In the following description, numerous specific details are set forth to provide a thorough description of the invention. However, it will be apparent to those skilled in the art that the invention may be practiced without these specific details. In other instances, well-known features have not been described in detail so as not to obscure the invention.

Although a diagram may depict components as logically separate, such depiction is merely for illustrative purposes. It can be apparent to those skilled in the art that the components portrayed can be combined or divided into separate software, firmware and/or hardware components. For example, one or more of the embodiments described herein can be implemented in a network accessible device/appliance such as a router. Furthermore, it can also be apparent to those skilled in the art that such components, regardless of how they are combined or divided, can execute on the same computing device or can be distributed among different computing devices connected by one or more networks or other suitable communication means.

In accordance with embodiments, there are provided mechanisms and methods for suspending work by a resource adapter. These mechanisms and methods for suspending work by a resource adapter can enable embodiments to provide the capability to start and stop work performed by a resource adapter to connector architectures. The ability of embodiments to provide the capability to start and stop work performed by a resource adapter can enable users of Connector Architectures to quiesce an adapter's inbound/outbound or work sections. Such capability can enable an adapter embodiment to complete in-flight transactions but not accept new inbound transactions until a request to resume operation is received. Resource adapters may be quiesced during a versioning or change out process or other maintenance processes for example.

In an embodiment, a method for providing a resource adapter is provided. The method embodiment receives, at a resource adapter, a request to suspend work being done by the resource adapter. A suspended state is entered. The suspended state comprises stopping work on transactions sent to the resource adapter. In an embodiment, entering a suspended state can includes finishing work in process. Entering a suspended state can also include queuing up work while the resource adapter is in the suspended state. Alternatively, in some embodiments, work received after entering the suspended state is rejected. Another alternative employed by some embodiments is sending a suspend message to an external system that decides how to process incoming requests targeting the resource adapter. The external system may then provide an end user that makes the request a message back indicating that the requested capability is not currently available, or alternatively, provide the end user with a message back indicating that the request is queued for later processing.

While the present invention is described with reference to an embodiment in which techniques for suspending work by a resource adapter are implemented in conformance with the J2EE Connector Architecture using executable programs written in the Java™ programming language, the present invention is not limited to the J2EE Connector Architecture nor the Java™ programming language. Embodiments may be practiced using other interconnectivity specifications or programming languages, i.e., JSP and the like without departing from the scope of the embodiments claimed. (Java™ is a trademark of Sun Microsystems, Inc.)

FIG. 1 is functional block diagram illustrating a high level overview of an example computing environment implementing a connector architecture in which techniques for suspending work by a resource adapter in an embodiment may be implemented. As shown in FIG. 1, a connector architecture implementation 100 includes application server 110, resource adaptor 120, enterprise information system (EIS) 130 and application component 140. As used herein, the term Enterprise Information System (EIS) is defined broadly to include any computing installation that provides the information infrastructure for an enterprise. The enterprise information system 130 may be realized with virtually any type or combination of computers, computer systems and peripheral devices. The components of enterprise information system 130 may be co-located or dispersed geographically in various installations. As used herein, the term application server is defined broadly as a server computer in a computer network dedicated to running certain software applications. Application server 110 exists in conjunction with a web server (not shown in FIG. 1 for brevity) or between a web server and enterprise information system 130 to provide middleware functionality for the enterprise. As used herein, the term resource adapter is defined broadly to include any segment of code that represents an Enterprise Information System (EIS). As used herein, the term application component is defined broadly as any data entry, update, query or program that processes data on behalf of a user. Users may be human or computational entities, including proxies and the like. Embodiments implement connector architecture 100 to enable one or more applications to establish connections between the application component 140 and the EIS 130.

In one embodiment, the connector architecture implementation 100 is compatible with the Java 2 Enterprise Edition (J2EE) Connector Architecture. This architecture provides for an EIS vendor-provided resource adaptor and an application server, to which the resource adaptor interfaces. The J2EE Connector Architecture defines a set of contracts, such as transactions, security, and connection management, which both the resource adaptor and application server require to communicate with one another. The connector architecture 100 may be implemented in an application server and an EIS-specific resource adaptor.

Application server 110 embodiments can be configured from a variety of hardware and software products. The application server 110 may run Java or other programming language environment, and may be configured to provide access to resources internal to the server, as well as resources reachable by the application server 110. Resources can include applications, services, databases web sites and other computer based resources. In one embodiment, the application server 110 utilizes WebLogic® Server from BEA systems of San Jose, Calif.

Resource adaptor 120 comprises a system level software driver used by application server 110 to connect to EIS 130. In an embodiment, resource adaptor 120 contains Java code and any native components required to facilitate interconnection between the application server 110 and the EIS 130. In one embodiment, the connector architecture 100 supports resource adaptors developed by EIS vendors and third party application developers that can be deployed in any application server according to the J2EE platform specification.

As further illustrated by FIG. 1, resource adaptor 120 includes a suspendable interface 122 for receiving requests to suspend and resume work sent to the resource adaptor 120. In an embodiment, suspendable interface 122 works in conjunction with a suspend/resume mechanism 124 that stops and starts work on transactions sent to the resource adaptor 120. Processing performed by an example suspend/resume mechanism embodiment will be described in further detail below with reference to FIGS. 2A-2E.

The EIS 130 provides the information infrastructure for an enterprise. In various embodiments, EIS 130 may provide one or more applications, programs or processes capable of providing services to a requestor or other recipient, including without limitation network based applications, web based server resident applications, web portals, search engines, photographic, audio or video information storage applications, e-Commerce applications, backup or other storage applications, sales/revenue planning, marketing, forecasting, accounting, inventory management applications and other business applications and other contemplated computer implemented services. The services may be exposed to clients as local or remote interfaces, or both.

Application component 140 may be at least a subset of an application, and can be implemented for example and without limitation, using an enterprise java bean (EJB), Java Server Page (JSP), servlet, or any combination thereof, that is deployed, managed, or executed on the application server 110.

The connector architecture 100 of FIG. 1 further includes system level contracts (not shown in FIG. 1 for brevity). System level contracts govern the interactions between the resource adaptor 120 and the application server 110. The contracts may relate to connection management or other aspects of the connector architecture. Connection management contracts allow an application server the ability to provide a pool of connections to underlying EISs that enable application components to connect to an EIS. In one embodiment of the present invention, the connection management relates to connection pool configuration, connection pool management, and connection management.

Figure 2A:
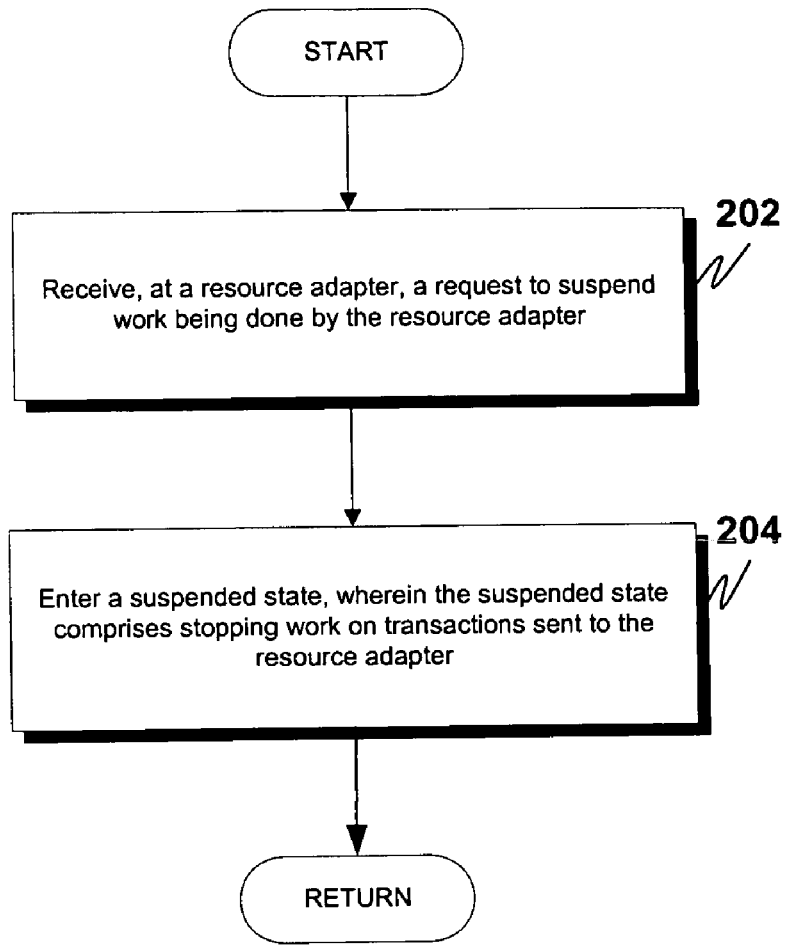
FIGS. 2A-2E are operational flow diagrams illustrating a high level overview of techniques for suspending and resuming a resource adapter in an embodiment.

FIGS. 2A-2E are operational flow diagrams illustrating a high level overview of techniques for suspending and resuming a resource adapter in an embodiment. A technique for suspending work by a resource adapter shown in FIG. 2A is operable with an application server, application component and resource adaptor, such as application server 110, application component 140 and resource adaptor 120 of FIG. 1, for example. As shown in FIG. 2A, a request to suspend work being done is received at a resource adapter (block 202). The request may be received from a Management Java Bean (MJB) or the like. In an embodiment, the request to suspend work being done by the resource adapter is received via a suspendable interface of the resource adapter. A suspended state is entered (block 204). The suspended state comprises stopping work on transactions sent to the resource adapter.

Figure 2B:
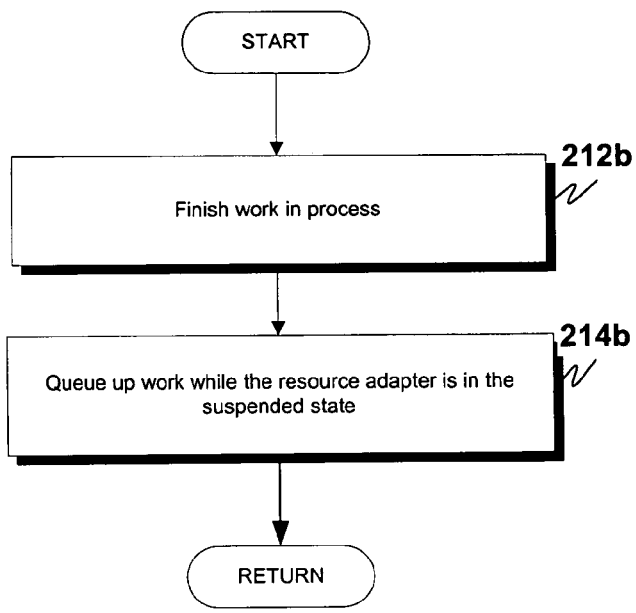
Figure 2C:
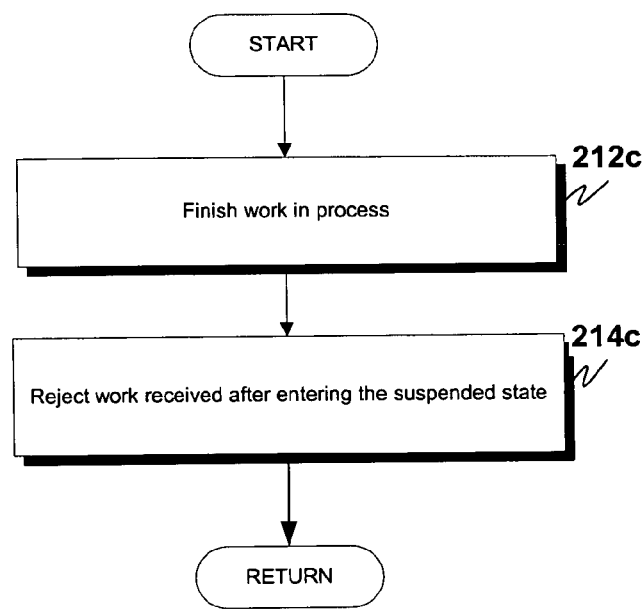
Figure 2D:
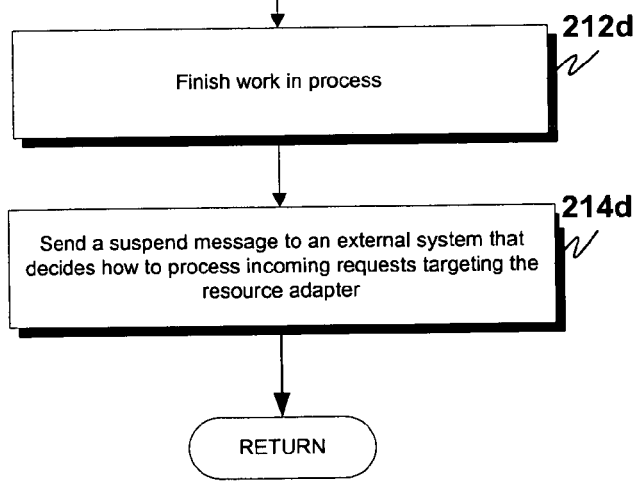

Entering a suspended state can include a variety of different strategies in various embodiments. For example, as illustrated by FIG. 2B, in one technique, entering a suspended state includes finishing up work in process (212*b*). Then, in the illustrated resource adapter embodiment, work received is queued up while the resource adapter is in the suspended state (block 214*b*). In an alternative embodiment, illustrated by FIG. 2C, a different technique is employed in which entering a suspended state includes finishing up work in process (212*c*). Then, in the illustrated resource adapter embodiment, work received is rejected while the resource adapter is in the suspended state (block 214*c*). In further alternative embodiment, as illustrated by FIG. 2D, entering a suspended state again includes finishing up work in process (212*d*). Then, a suspend message is sent to an external system that decides how to process incoming requests targeting the resource adapter (214*d*).

Figure 2E:
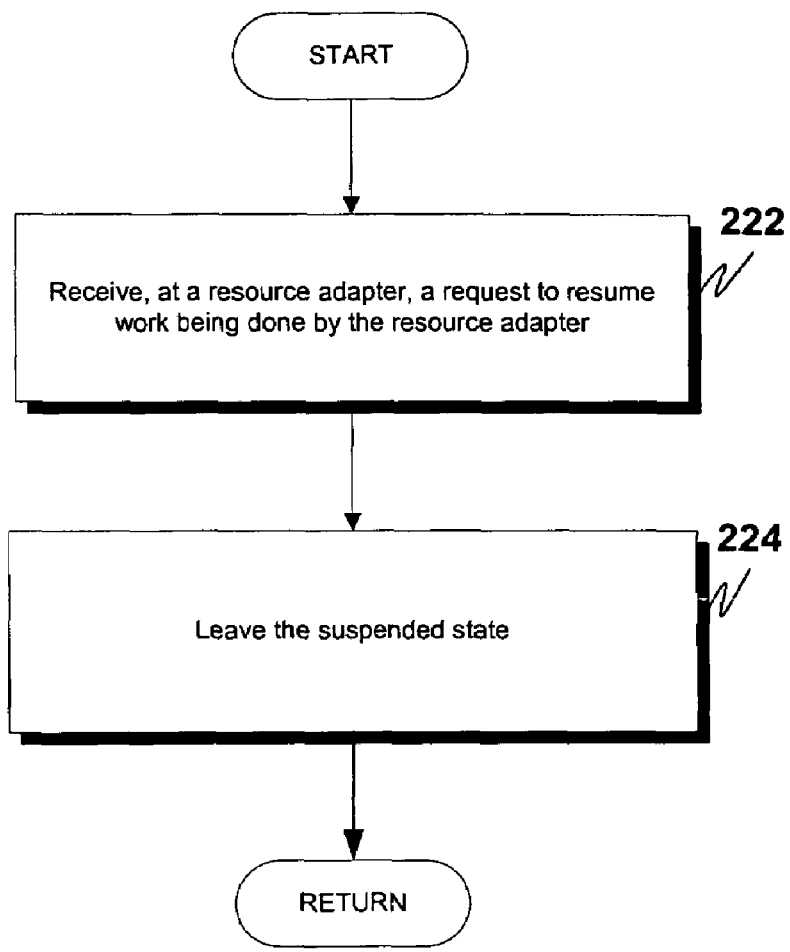
Figure 3:
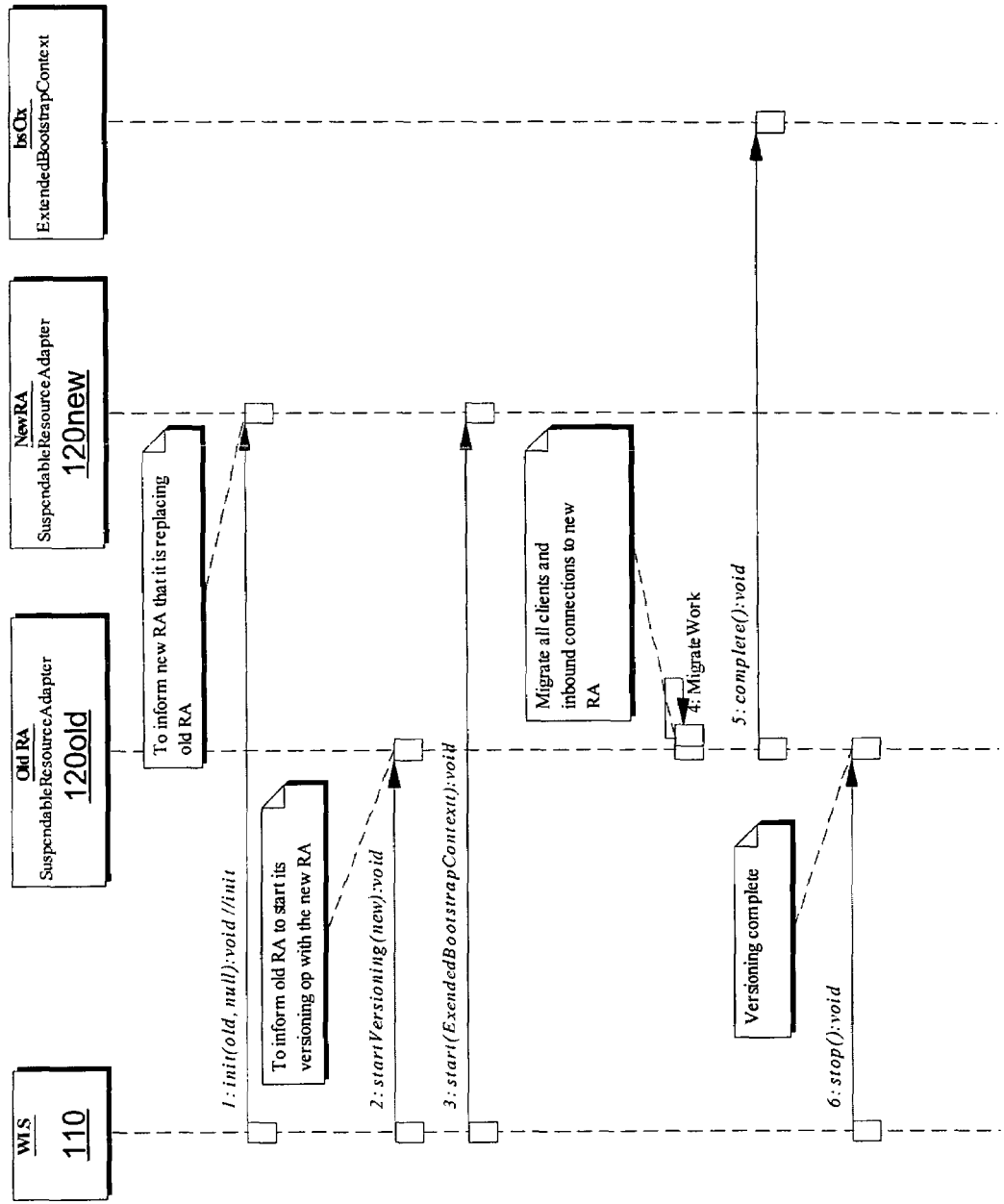
FIG. 3 functional block diagram illustrating an high level overview an example resource adapter loading mechanism based employing techniques for suspending work by a resource adapter in an embodiment.

FIG. 2E illustrates a high-level overview of a process for resuming work at the resource adapter in an embodiment. As shown by FIG. 2E, a request to resume work is received at a resource adapter (block 222). The suspended state is left (block 224). FIG. 3 functional block diagram illustrating an high level overview an example resource adapter loading mechanism based employing techniques for suspending work by a resource adapter in an embodiment. As shown by FIG. 3, transaction flows between old and new resource adapters, application server and EIS facilitate a process of substituting a new version resource adaptor for a production version of the resource adaptor in an embodiment. Further detailed description of the use of suspend and resume mechanisms for versioning resource adaptors may be had with reference to commonly owned co-pending U.S. patent application Ser. No. 11/282,060 entitled PRODUCTION REDEPLOYMENT, by James Gish, et al., filed on Nov. 17, 2005.

In other aspects, the invention encompasses in some embodiments, computer apparatus, computing systems and machine-readable media configured to carry out the foregoing methods. In addition to an embodiment consisting of specifically designed integrated circuits or other electronics, the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium (media) having instructions stored thereon/in which can be used to program a computer to perform any of the processes of the present invention. The storage medium can include, but is not limited to, any type of rotating media including floppy disks, optical discs, DVD, CD-ROMs, microdrive, and magneto-optical disks, and magnetic or optical cards, nanosystems (including molecular memory ICs), or any type of media or device suitable for storing instructions and/or data.

Stored on any one of the machine readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications.

Included in the programming (software) of the general/specialized computer or microprocessor are software modules for implementing the teachings of the present invention, including, but not limited to providing mechanisms and methods for suspending work by a resource adapter as discussed herein.

Figure 4:
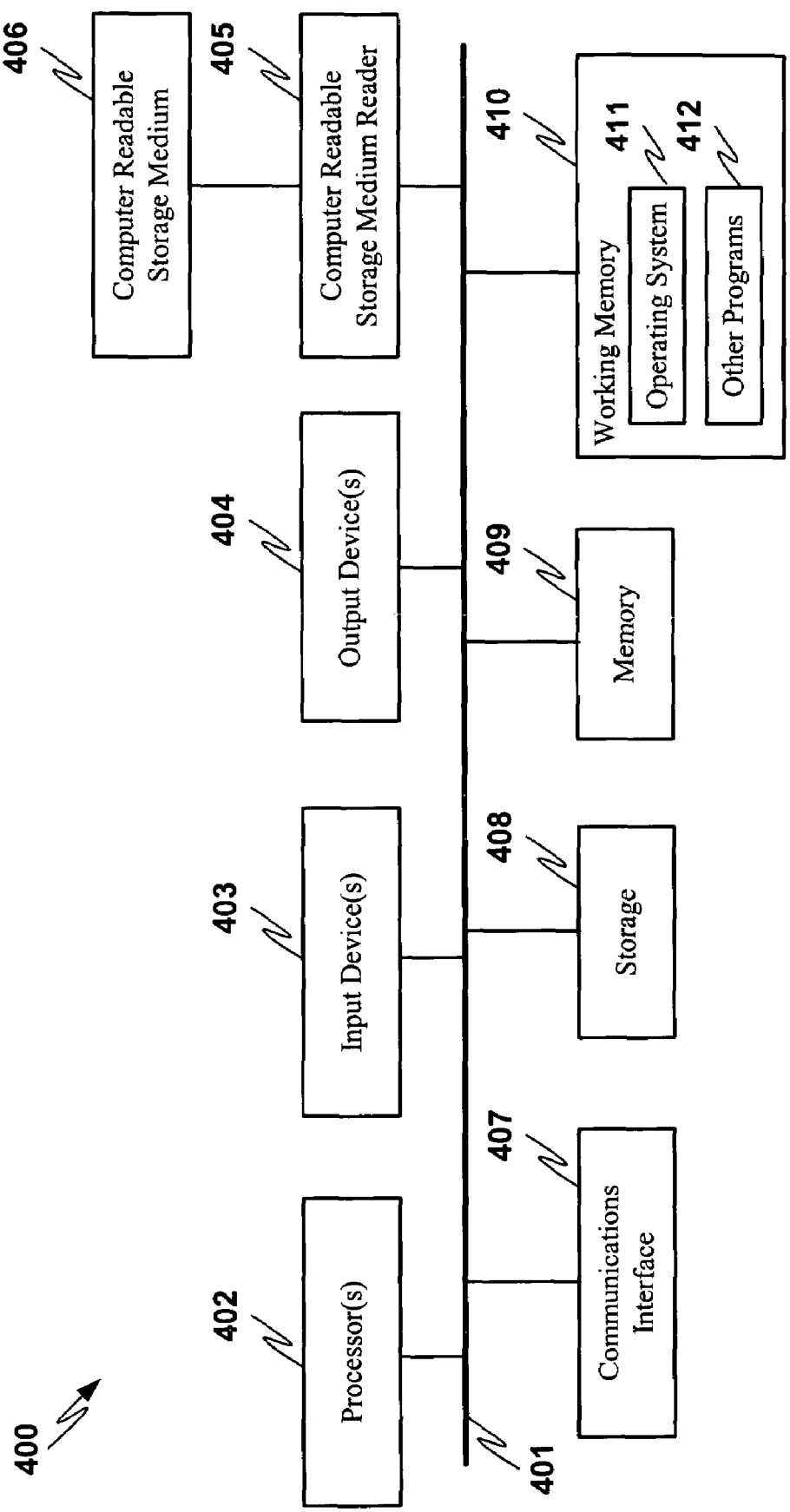
FIG. 4 is a hardware block diagram of an example computer system, which may be used to embody one or more components in an embodiment.

FIG. 4 illustrates an exemplary processing system 400, which can comprise one or more of the elements of FIG. 1. Turning now to FIG. 4, an exemplary computing system is illustrated that may comprise one or more of the components of FIG. 1. While other alternatives might be utilized, it will be presumed for clarity sake that components of the systems of FIG. 1 are implemented in hardware, software or some combination by one or more computing systems consistent therewith, unless otherwise indicated.

Computing system 400 comprises components coupled via one or more communication channels (e.g., bus 401) including one or more general or special purpose processors 402, such as a Pentium®, Centrino®, Power PC®, digital signal processor ("DSP"), and so on. System 400 components also include one or more input devices 403 (such as a mouse, keyboard, microphone, pen, and so on), and one or more output devices 404, such as a suitable display, speakers, actuators, and so on, in accordance with a particular application. (It will be appreciated that input or output devices can also similarly include more specialized devices or hardware/software device enhancements suitable for use by the mentally or physically challenged.)

System 400 also includes a machine readable storage media reader 405 coupled to a machine readable storage medium 406, such as a storage/memory device or hard or removable storage/memory media; such devices or media are further indicated separately as storage 408 and memory 409, which may include hard disk variants, floppy/compact disk variants, digital versatile disk ("DVD") variants, smart cards, read only memory, random access memory, cache memory, and so on, in accordance with the requirements of a particular application. One or more suitable communication interfaces 407 may also be included, such as a modem, DSL, infrared, RF or other suitable transceiver, and so on for providing inter-device communication directly or via one or more suitable private or public networks or other components that may include but are not limited to those already discussed.

Working memory 410 further includes operating system ("OS") 411 elements and other programs 412, such as one or more of application programs, mobile code, data, and so on for implementing system 400 components that might be stored or loaded therein during use. The particular OS or OSs may vary in accordance with a particular device, features or other aspects in accordance with a particular application (e.g. Windows®, WindowsCE™, Mac™, Linux, Unix or Palm™ OS variants, a cell phone OS, a proprietary OS, Symbian™, and so on). Various programming languages or other tools can also be utilized, such as those compatible with C variants (e.g., C++, C#), the Java™ 2 Platform, Enterprise Edition ("J2EE") or other programming languages in accordance with the requirements of a particular application. Other programs 412 may further, for example, include one or more of activity systems, education managers, education integrators, or interface, security, other synchronization, other browser or groupware code, and so on, including but not limited to those discussed elsewhere herein.

When implemented in software (e.g. as an application program, object, agent, downloadable, servlet, and so on in whole or part), a learning integration system or other component may be communicated transitionally or more persistently from local or remote storage to memory (SRAM, cache memory, etc.) for execution, or another suitable mechanism can be utilized, and components may be implemented in compiled or interpretive form. Input, intermediate or resulting data or functional elements may further reside more transitionally or more persistently in a storage media, cache or other volatile or non-volatile memory, (e.g., storage device 408 or memory 409) in accordance with a particular application.

Other features, aspects and objects of the invention can be obtained from a review of the figures and the claims. It is to be understood that other embodiments of the invention can be developed and fall within the spirit and scope of the invention and claims. The foregoing description of preferred embodiments of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

The invention claimed is:

1. A method for providing a resource adapter, the method comprising:
    receiving, at a resource adapter, a request to suspend work being done by the resource adapter; and
    entering a suspended state, wherein the suspended state comprises stopping work on transactions sent to the resource adapter;
    wherein entering a suspended state comprises: finishing work in process.

2. A method for providing a resource adapter, the method comprising:
    receiving, at a resource adapter, a request to suspend work being done by the resource adapter; and
    entering a suspended state, wherein the suspended state comprises stopping work on transactions sent to the resource adapter;
    wherein entering a suspended state comprises:
    rejecting work received after entering the suspended state.

3. A method for providing a resource adapter, the method comprising:
    receiving, at a resource adapter, a request to suspend work being done by the resource adapter; and
    entering a suspended state, wherein the suspended state comprises stopping work on transactions sent to the resource adapter;
    wherein entering a suspended state comprises:
    sending a suspend message to an external system that decides how to process incoming requests targeting the resource adapter.

4. The method of claim 3, wherein sending a suspend message to an external system that decides how to process incoming requests targeting the resource adapter comprises:
    sending a suspend message to an external system that decides how to process incoming requests targeting the resource adapter, the external system providing an end user that makes the request a message back indicating that the requested capability is not currently available.

5. The method of claim 3, wherein sending a suspend message to an external system that decides how to process incoming requests targeting the resource adapter comprises:
    sending a suspend message to an external system that decides how to process incoming requests targeting the resource adapter, the external system providing an end user that makes the request a message back indicating that the request is queued for later processing.

6. The A machine-readable medium cawing one or more sequences of instructions for providing a resource adapter, which instructions, when executed by one or more processors, cause the one or more processors to carry out the steps of:
    receiving, at a resource adapter, a request to suspend work being done by the resource adapter; and
    entering a suspended state, wherein the suspended state comprises stopping work on transactions sent to the resource adapter;
    wherein the instructions for carrying out the step of entering a suspended state include instructions for carrying out the step of:
    finishing work in process.

7. A machine-readable medium cawing one or more sequences of instructions for providing a resource adapter, which instructions, when executed by one or more processors, cause the one or more processors to carry out the steps of:
    receiving, at a resource adapter, a request to suspend work being done by the resource adapter; and
    entering a suspended state, wherein the suspended state comprises stopping work on transactions sent to the resource adapter;
    wherein the instructions for carrying out the step of entering a suspended state include instructions for carrying out the step of:
    rejecting work received after entering the suspended state.

8. A machine-readable medium cawing one or more sequences of instructions for providing a resource adapter, which instructions, when executed by one or more processors, cause the one or more processors to carry out the steps of:
    receiving, at a resource adapter, a request to suspend work being done by the resource adapter; and
    entering a suspended state, wherein the suspended state comprises stopping work on transactions sent to the resource adapter;

wherein the instructions for carrying out the step of entering a suspended state include instructions for carrying out the step of:
sending a suspend message to an external system that decides how to process incoming requests targeting the resource adapter.

9. The machine-readable medium as recited in claim 8, wherein the instructions for carrying out the step of sending a suspend message to an external system that decides how to process incoming requests targeting the resource adapter include instructions for carrying out the step of:
sending a suspend message to an external system that decides how to process incoming requests targeting the resource adapter, the external system providing an end user that makes the request a message back indicating that the requested capability is not currently available.

10. The machine-readable medium as recited in claim 8, wherein the instructions for carrying out the step of sending a suspend message to an external system that decides how to process incoming requests targeting the resource adapter include instructions for carrying out the step of:
sending a suspend message to an external system that decides how to process incoming requests targeting the resource adapter, the external system providing an end user that makes the request a message back indicating that the request is queued for later processing.

* * * * *

UNITED STATES PATENT AND TRADEMARK OFFICE
CERTIFICATE OF CORRECTION

PATENT NO. : 7,496,705 B2
APPLICATION NO. : 11/281831
DATED : February 24, 2009
INVENTOR(S) : Gish et al.

It is certified that error appears in the above-identified patent and that said Letters Patent is hereby corrected as shown below:

In column 8, line 29, in claim 6, before "A" delete "The".

In column 8, line 29, in claim 6, delete "cawing" and insert -- carrying --, therefor.

In column 8, line 43, in claim 7, delete "cawing" and insert -- carrying --, therefor.

In column 8, line 58, in claim 8, delete "cawing" and insert -- carrying --, therefor.

Signed and Sealed this

Eighteenth Day of May, 2010

David J. Kappos
*Director of the United States Patent and Trademark Office*